US011194884B2

(12) United States Patent
Brunet et al.

(10) Patent No.: US 11,194,884 B2
(45) Date of Patent: Dec. 7, 2021

(54) METHOD FOR FACILITATING IDENTIFICATION OF NAVIGATION REGIONS IN A WEB PAGE BASED ON DOCUMENT OBJECT MODEL ANALYSIS

(71) Applicant: INTERNATIONAL BUSINESS MACHINES CORPORATION, Armonk, NY (US)

(72) Inventors: Thomas Andrew Brunet, Round Rock, TX (US); Shunguo Yan, Austin, TX (US); Phillip Jenkins, Cedar Park, TX (US); Kevin Tan, West Lafayette, IN (US)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 16/445,644

(22) Filed: Jun. 19, 2019

(65) Prior Publication Data

US 2020/0401646 A1 Dec. 24, 2020

(51) Int. Cl.
*G06F 40/154* (2020.01)
*G06F 16/957* (2019.01)

(52) U.S. Cl.
CPC ...... *G06F 16/9577* (2019.01); *G06F 16/9574* (2019.01); *G06F 40/154* (2020.01)

(58) Field of Classification Search
None
See application file for complete search history.

(56) References Cited

U.S. PATENT DOCUMENTS

| 9,489,131 | B2 | 11/2016 | Seymour et al. | |
| 2004/0205614 | A1* | 10/2004 | Keswa | H04L 63/08 |
| | | | | 715/239 |
| 2008/0139191 | A1* | 6/2008 | Melnyk | G06F 16/9577 |
| | | | | 455/419 |
| 2011/0258528 | A1* | 10/2011 | Roper | G06F 40/143 |
| | | | | 715/234 |
| 2013/0104029 | A1* | 4/2013 | Hendry | G06F 40/166 |
| | | | | 715/234 |
| 2013/0332815 | A1 | 12/2013 | Gallo et al. | |
| 2015/0169511 | A1* | 6/2015 | Chen | G06F 40/143 |
| | | | | 715/234 |
| 2015/0278868 | A1* | 10/2015 | O'Connor | G06Q 30/0263 |
| | | | | 705/14.41 |
| 2017/0140063 | A1 | 5/2017 | Dey et al. | |

FOREIGN PATENT DOCUMENTS

WO    2014169775 A    10/2014

* cited by examiner

*Primary Examiner* — Ariel Mercado
(74) *Attorney, Agent, or Firm* — Gavin Giraud (57) ABSTRACT

A method for facilitating identification of navigation regions in a web page based on document object model (DOM) analysis is provided. In one embodiment, the method includes analyzing the web page for features. The features include at least one of: interactive elements, content regions, link region roots, or landmarks. The method also includes representing the features in a tree structure and analyzing the tree structure for a link density to identify non-main landmarks, a reading order, and main content roots. The method further includes enabling a region navigation for the web page based on the identified non-main landmarks, reading order, and main content roots.

20 Claims, 4 Drawing Sheets

METHOD FOR FACILITATING IDENTIFICATION OF NAVIGATION REGIONS IN A WEB PAGE BASED ON DOCUMENT OBJECT MODEL ANALYSIS

BACKGROUND

The present invention relates to assistive technologies, and more specifically, to a method for facilitating identification of navigation regions in a web page based on document object model analysis.

Users of assistive technologies, such as a user who is blind and using a screen reader, experience web page content linearly. Therefore, the visual layout of content on a web page is not available to the user, and they need mechanisms to be able to jump through the content to quickly navigate to regions of the web page. The Web Accessibility Initiative—Accessible Rich Internet Application (ARIA) specification and version 5 of Hypertext Markup Language (HTML 5.0) protocol provide standards for such mechanisms, for example, through landmark elements and roles. Web page developers are expected to specify these landmark regions in their content, but they often lack awareness or skill to know to place them, place them incorrectly, or place them for search engine optimization rather than to enhance user experience.

Most conventional approaches to identify navigation regions rely on page renderings, which do not necessarily match the content presented to screen reader users and can be difficult to generate. Some web pages present off screen navigation regions to screen reader users which would not be detected by algorithms that are processing visual content. Also, web browsers have limitations on how much of the web page can be captured, so complete screenshots must be stitched together. However, some web page designs change when they are scrolled, which creates complications in stitching the screenshots into a single screenshot. Some conventional algorithms try to compensate by focusing on Cascading Style Sheets (CSS) computed values, however these computations do not accurately match the rendered content. For example, child text and content can be rendered in overflow or may not fill the element, resulting in inaccurate calculations.

Some other conventional approaches rely on machine-learning clustering algorithms, which can be computationally expensive, and which may result in clusters that are difficult to label as landmark regions.

SUMMARY

According to an embodiment, a method is provided for facilitating identification of navigation regions in a web page based on document object model (DOM) analysis. The method includes analyzing the web page for features, wherein the features include at least one of: interactive elements, content regions, link region roots, or landmarks. The method also includes representing the features in a tree structure and analyzing the tree structure for a link density to identify non-main landmarks, a reading order, and main content roots. The method further includes enabling a region navigation for the web page based on the identified non-main landmarks, reading order, and main content roots.

In another form, a computer program product for facilitating identification of navigation regions in a web page based on DOM analysis is provided. The computer program product comprises a computer readable storage medium having program instructions embodied therewith, the program instructions executable by a processor to cause the processor to perform a method comprising: analyzing the web page for features, wherein the features include at least one of: interactive elements, content regions, link region roots, or landmarks. The method also comprises representing the features in a tree structure. The method further comprises analyzing the tree structure for a link density to identify non-main landmarks, a reading order, and main content roots and enabling a region navigation for the web page based on the identified non-main landmarks, reading order, and main content roots.

In another form, a system for implementing the method for facilitating identification of navigation regions in a web page based on DOM analysis is provided. The system comprises at least one computer including a processor configured to perform a method comprising analyzing the web page for features, wherein the features include at least one of: interactive elements, content regions, link region roots, or landmarks. The method also comprises representing the features in a tree structure. The method further comprises analyzing the tree structure for a link density to identify non-main landmarks, a reading order, and main content roots and enabling a region navigation for the web page based on the identified non-main landmarks, reading order, and main content roots.

According to an aspect of the embodiments, the web page is compliant with an accessible rich internet application (ARIA) specification.

According to a further aspect of the embodiments, the main content roots are merged.

According to a further aspect of the embodiments, merging the main content roots comprises inserting one of a division (DIV) object or a main element into the DOM.

According to an aspect of the embodiments, the method is implemented by a web browser.

According to an aspect of the embodiments, the method is automatically performed upon loading of the web page.

According to a further aspect of the embodiments, the method is performed upon initiation by a user.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
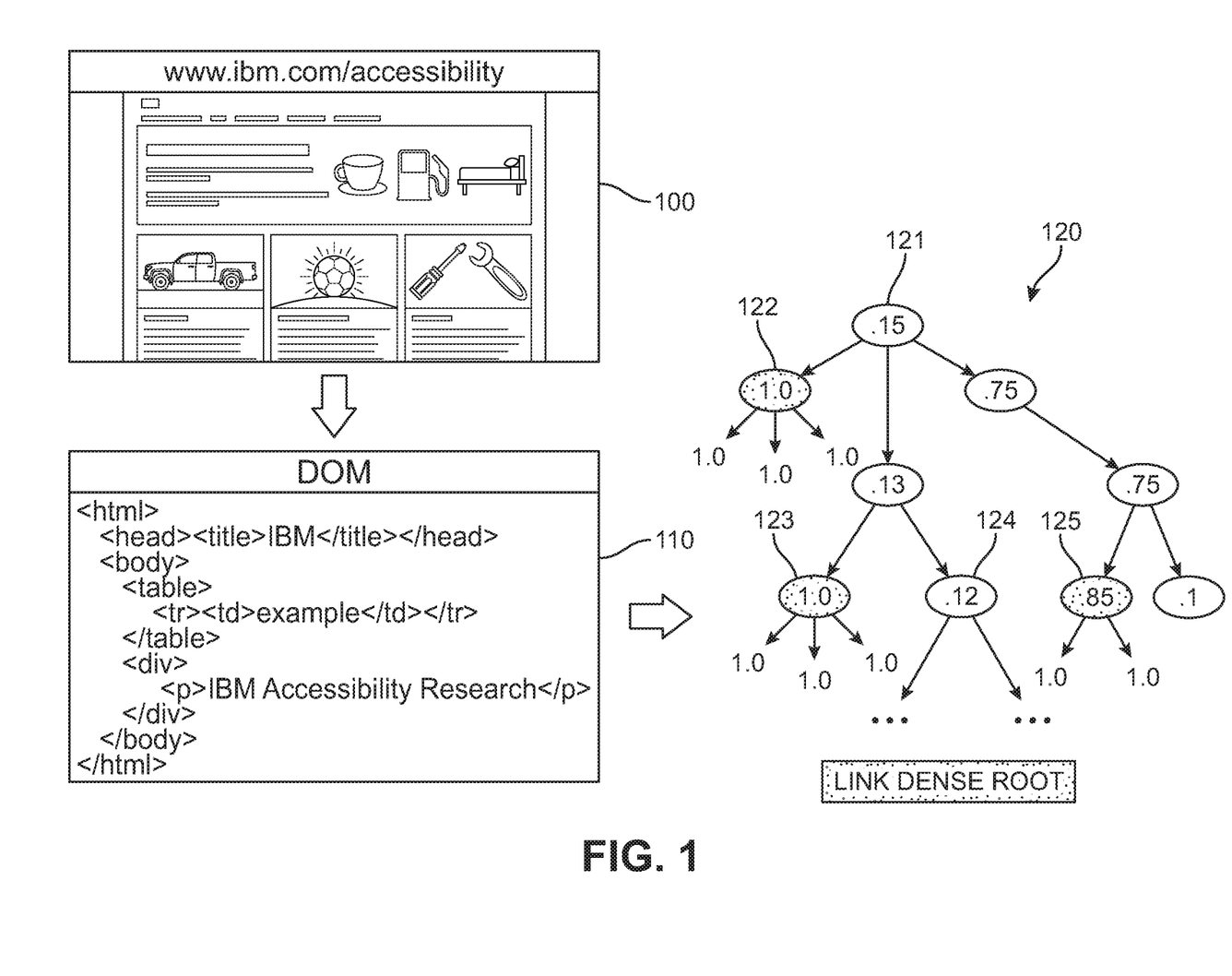
FIG. 1 is a schematic view of an example embodiment of a web page on which techniques for facilitating identification of navigation regions may be implemented.

Aspects of the example embodiments described herein provide a method for facilitating identification of navigation regions in a web page based on document object model (DOM) analysis. The techniques of the example embodiments automatically determine a collection of landmarks for a web page, which can be used to automatically assign the landmarks if they are missing, or to assess the appropriateness of landmarks that already exist in a web page. With reference now to FIG. 1, an example embodiment of a web page on which techniques for facilitating identification of navigation regions may be implemented is shown.

As shown in FIG. 1, an example of a web page 100 is illustrated on which techniques for facilitating identification of navigation regions may be implemented as described herein. Generally, a web page, such as web page 100, may be associated with a document object model (DOM) that is an application programming interface for hypertext markup language (HTML) and/or extensible markup language (XML) documents. A DOM for a given web page defines the logical structure of the HTML/XML documents and can be used by a web page programmer to build the documents, navigate their structure, and add, modify, or delete elements and content. For example, in this embodiment, web page 100 is associated with a corresponding DOM 110.

Moreover, the logical structure of the DOM may be represented by a tree structure. The tree structure of the DOM represents a document as a hierarchical tree of nodes, which nodes can have parents, children, and siblings that are determined by each node's position in the tree structure. There can be several node types in the tree, each representing different information or markup in the HTML/XML document. Each node type has different properties, methods, data, events, and each may have relationships with other nodes in the tree. Additionally, the position of the nodes in the tree structure represents a reading order of the nodes as presented in the corresponding web page.

For example, as shown in FIG. 1, a tree structure 120 may be used to represent the structure of DOM 110. In this embodiment, tree structure 120 comprises a plurality of nodes, including at least a parent node 121, a first child node 122, a pair of sibling nodes including a first sibling node 123 and a second sibling node 124, and a second child node 125. It should be understood that tree structure 120 includes other nodes that are not described herein and the number and types of nodes will be specific to the particular web page and corresponding DOM.

According to the techniques described herein, identification of navigation regions in a web page based on DOM analysis includes determining regions or sections on the web page that are particularly link-dense. That is, areas of the web page where more links than content are present. For example, in reference to the example web page 100, as can be seen in tree structure 120 of the corresponding DOM 110 for web page 100, several nodes are determined to be link-dense. In this embodiment, first child node 122, first sibling node 123, and second child node 125 are determined to be link-dense. In contrast, other nodes in tree structure 120, including at least parent node 121 and second sibling node 124, are not considered to be link-dense nodes.

As shown in FIG. 1, each node of the plurality of nodes in tree structure 120 is shown with a number representing the link density in the respective node. In an example embodiment, a node may be considered link-dense when the visible link density is greater than 0.75 and the number of links is two or more. For example, as shown in FIG. 1, first child node 122 (visible link density=1.0), first sibling node 123 (visible link density=1.0), and second child node 125 (visible link density=0.85) are link-dense nodes, whereas parent node 121 (visible link density=0.15) and second sibling node 124 (visible link density=0.12) are not link-dense nodes. In other embodiments, the values for determining whether or not a node is a link-dense node may be smaller or larger.

The method for facilitating identification of navigation regions in a web page of the present embodiments focuses on interactive elements on a web page, for example, links and buttons, as part of the process of identifying content regions in the web page. In an example embodiment, an interaction element may be a link or button within a web page, however, the definition of interaction elements can be expanded to include additional elements on a web page.

Figure 2:
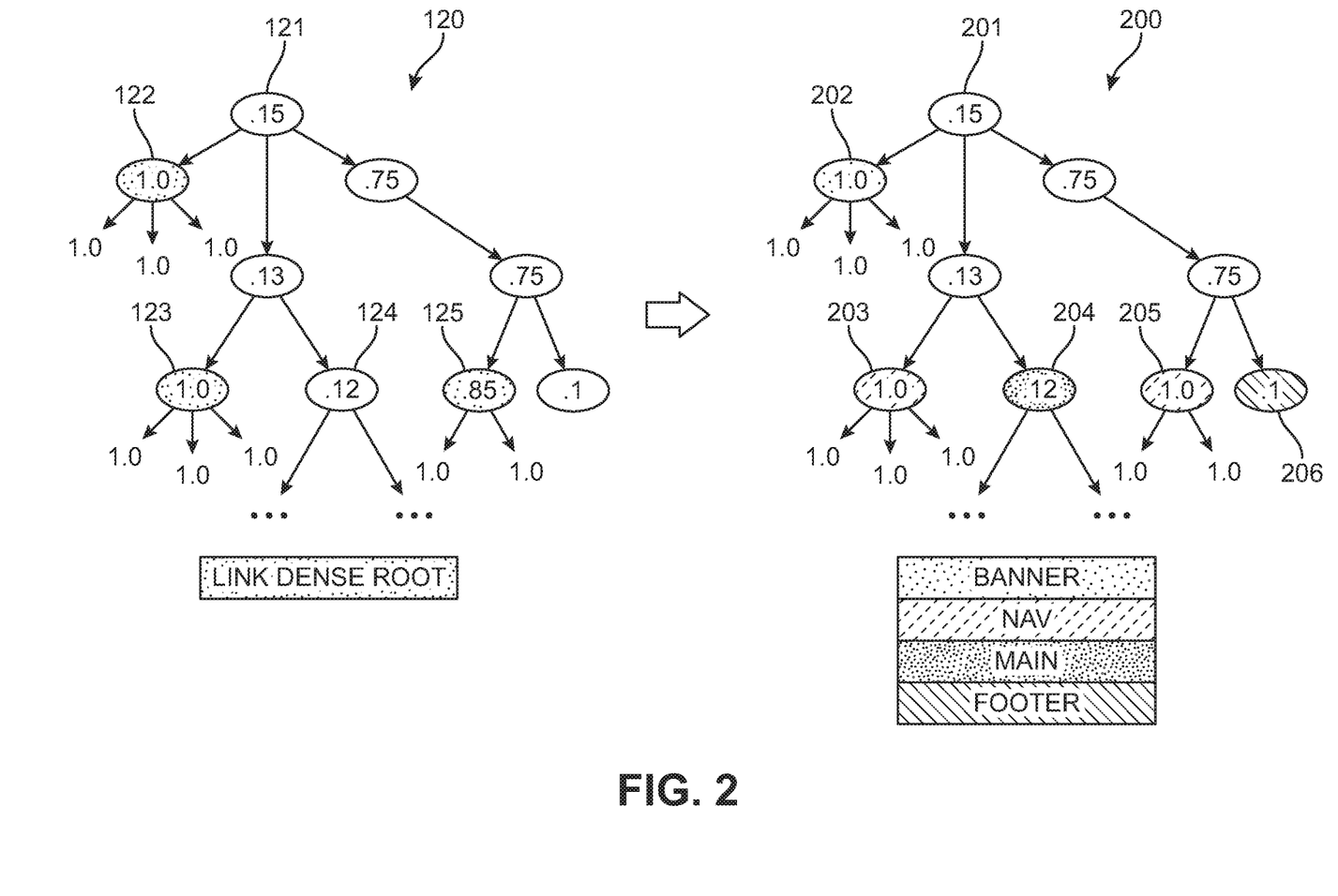
FIG. 2 is a representative view of an example embodiment of a web page tree structure with identification of navigation regions according to the example embodiments.

Referring now to FIG. 2, a representative view of an example embodiment of a web page tree structure 120 with identification of navigation regions according to the example embodiments is illustrated. In this embodiment, the method for facilitating identification of navigation regions in a web page based on DOM analysis described herein is applied to tree structure 120 of the corresponding DOM 110 for web page 100 (as shown in FIG. 1) to generate a modified tree structure 200 associated with web page 100.

As described above, the ARIA specification defines a set of specialized landmark roles. These landmarks provide a mechanism to programmatically identify commonly found sections of web page content in a consistent way. Adding ARIA landmarks to a web page provides useful global navigation features and aids understanding of content structure for users of assistive technology. In an example embodiment, the method for facilitating identification of navigation regions begins with analyzing the web page to calculate or determine features. The features include at least one of: interactive elements, content regions, link region roots, or landmarks.

In this embodiment, tree structure 120 is analyzed and multiple values for each node or element of tree structure 120 may be calculated. For example, one or more of the following values may be calculated for each node/element:

A number of links (NUM_LINKS), which equals the number of interaction elements that are descendants of the element;

A number of link characters (LINK_CHARS), which equals the number of non-whitespace characters that are within an interaction element descendant of the element;

A number of content characters (CONTENT_CHARS), which equals the number of non-whitespace characters that are not within an interaction element descendant of the element;

A number of visible link characters (VISIBLE_LINK_CHARS) and/or a number of visible content characters (VISIBLE_CONTENT_CHARS), which is calculated in the same manner as LINK_CHARS and CONTENT_CHARS above, but excluding any hidden content;

A link density (LINK_DENSITY), which equals the percentage of link content associated with the element. Link density may be calculated as follows: (LINK_CHARS/(LINK_CHARS+CONTENT_CHARS));

A visible link density (VISIBLE_LINK_DENSITY), which equals the percentage of visible link content associated with the element. Visible link density may be calculated as follows: (VISIBLE_LINK_CHARS/(VISIBLE_LINK_CHARS+VISIBLE_CONTENT_CHARS)).

Next, the method for facilitating identification of navigation regions of the present embodiments further includes identifying link region roots. To identify the link region roots, parents of the interaction elements are walked up on tree structure 120 to find a set of ancestors with the least depth that is determined to be link-dense. For example, as described above, an element or node may be considered link-dense when the visible link density is greater than 0.75 (i.e., VISIBLE_LINK_DENSITY>0.75) and the number of links is two or more (i.e., NUM_LINKS_≥2). For example, as shown in FIG. 2, first child node 122 (visible link density=1.0), first sibling node 123 (visible link density=1.0), and second child node 125 (visible link density=0.85) are link-dense nodes/elements.

The link region roots identified above may be further tuned or modified. For example, if multiple link region roots are children of a defined structure (e.g., list, tree, menu, etc.), the parent of that structure (e.g., ul for a list) is added to the set of link region roots and the descendants of that element are removed. Next, one or more non-main landmarks on the web page are identified. These non-main landmarks include potential navigation landmarks, banners, and/or footers.

For example, link region roots near the top and bottom of the web page can be identified as potential navigation landmarks. In an example embodiment, a bounding box may be used to define or determine which link region roots are considered "near" the top and/or bottom of the web page. For example, in one embodiment, bounding boxes that are within 300 pixels of the top and bottom of the web page may be used to determine which link region roots are considered "near" the top and/or bottom of the web page.

Next, the technique for identifying the banner on the web page is described. In an example embodiment, if the first link region root does not contain the first piece of visible content on the web page, the banner is assigned as the greatest ancestor of the first piece of visible content that does not contain the first link region root. If the first identified link region root does contain the first piece of visible content on the web page and a bounding box of the link region is a significant width of the web page (e.g., approximately 80% of the width), then the link region is converted from a navigation landmark to a banner. In other embodiments, however, there should be no banner under these circumstances, in which case the link region may remain as a navigation landmark.

The technique for identifying the footer on the web page is similar to the technique for identifying the banner, as described above. In this embodiment, if the last link region root does not contain the last piece of visible content on the web page, the banner is assigned as the greatest ancestor of the last piece of visible content that does not contain the last link region root. If the last identified link region root does contain the last piece of visible content on the web page and a bounding box of the link region is a significant width of the web page (e.g., approximately 80% of the width), then the link region is converted from a navigation landmark to a footer.

Each of the identified banner section(s), navigation landmarks, and/or footer section(s), may further include search and/or forms within the section. For example, if a form element exists within a banner, navigation, or footer section, then the form element is assigned as a search landmark. If a form element exists that requires a password type input, then the form element is assigned as a form landmark.

The method for facilitating identification of navigation regions of the present embodiments further includes identifying main content roots on the web page. For example, the greatest ancestors of content not contained within the identified banner, footer, or navigation are identified as main content roots. In an example embodiment, one or more identified main content roots may be merged. For example, if there are multiple main content roots and the main content roots are siblings of each other (e.g., first sibling node 123 and second sibling node 124), then these nodes may be merged by inserting a node (e.g., a division object (DIV)) so that these nodes have a common parent.

If there are still multiple main content roots, then the one with the most combined content is selected as the main content (i.e., the ancestor that takes up the largest area of the web page as determined by the width times the height of its bounding box). Other content on the web page that is not within any landmark can be identified and labelled as complementary.

Applying the techniques described above for identification of navigation regions in web page 100 based on analysis of DOM 110, results in changing tree structure 120 to modified tree structure 200. In the embodiment shown in FIG. 2, modified tree structure 200 includes identified regions on web page 100 associated with a banner, navigation landmarks, main content, and a footer. In this embodiment, modified tree structure 200 includes a plurality of nodes that have been identified as being associated with different regions of web page 100.

As shown in FIG. 2, modified tree structure 200 includes a parent node 201, a banner node 202, a pair of sibling nodes including a first sibling node 203 and a second sibling node 204, a navigation node 205, and a footer node 206. By applying the above-described techniques, the plurality of nodes identified in modified tree structure 200 include more details regarding their relation to different regions of web page 100. For example, banner node 202 is identified as being associated with a banner of web page 100, first sibling node 203 is identified as being associated with a navigation landmark of web page 100, second sibling node 204 is identified as being associated with a main content root of web page 100, navigation node 205 is identified as being associated with another navigation landmark of web page 100, and footer node 206 is identified as being associated with a footer of web page 100.

The method according to the techniques of the present embodiments may be implemented in a variety of different formats. For example, the method may be implemented by a web browser, browser extension, or application, such as a script or other executing software module. The method may also be implemented on a user's personal computer or a server, such as a server hosting a web page. Additionally, in some embodiments, the method of the example embodiments may be configured to be implemented automatically, such as being implemented automatically upon loading of a web page. In other embodiments, the method may be implemented only upon initiation by a user. The example embodiments described herein may be implemented by users, such as users of assistive technology, as well as by programmers or web page designers or developers, for example, to test accessibility features of a web page.

The results of the implemented method identify the various navigation regions or landmarks on a given web page. Those identified navigation regions and/or landmarks may be provided as suggestions, for example, to a programmer or web page designer/developer, as a tool to assess the appropriateness or compatibility of the web page with assistive technologies (e.g., an ARIA compliant/compatible interface). The identified navigation regions and/or landmarks may also be automatically assigned to the web page to improve the accessibility of the web page being analyzed.

Figure 3:
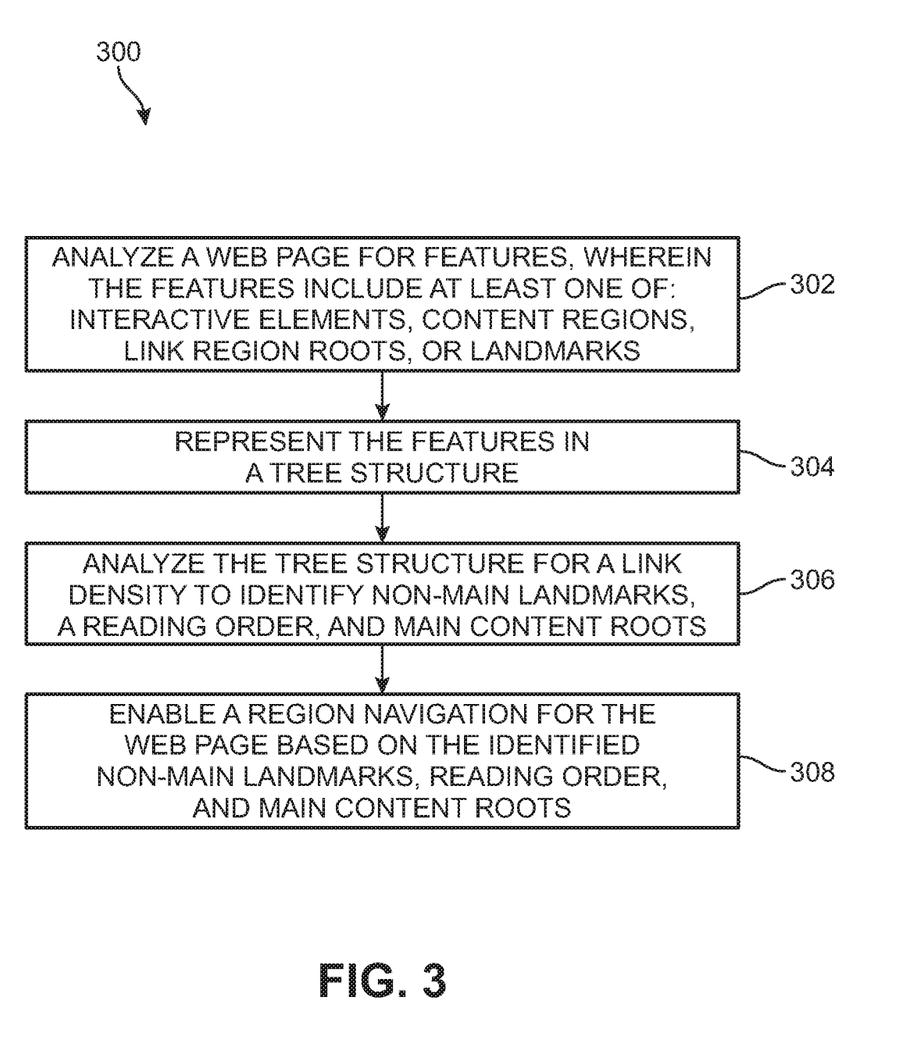
FIG. 3 is a flowchart of an example embodiment of a method for facilitating identification of navigation regions.

Referring now to FIG. 3, a flowchart of a method 300 for facilitating identification of navigation regions in a web page based on DOM analysis is illustrated. In an example embodiment, method 300 may be implemented by a processor of a computer. For example, as described above, method 300 may be implemented by a web browser, a browser extension, application, personal computer, and/or server, as well as by a processor of any type of computing device.

In this embodiment, method 300 begins at an operation 302. At operation 302, a web page is analyzed for features. The features include at least one of interactive elements, content regions, link region roots, or landmarks. For example, as described above with regard to features of web page 100 based on analysis of DOM 110. Next, method 300 includes an operation 304 where the features determined at operation 302 are represented in a tree structure. For example, features of web page 100 are represented in tree structure 120, shown in FIGS. 1 and 2 above.

Next, method 300 includes an operation 306. At operation 306, the tree structure is analyzed for a link density to identify non-main landmarks, a reading order, and main content roots. For example, the visible link density for each node of tree structure may be determined using the techniques described above in reference to FIGS. 1 and 2.

Method 300 also includes an operation 308 where a region navigation is enabled for the web page based on the identified non-main landmarks, reading order, and main content roots. For example, as shown in FIG. 2, modified tree structure 200 includes more details than tree structure 120 regarding the relation of each node or element to different regions of web page 100. With this arrangement, method 300 may be used to identify navigation regions and/or landmarks on the web page to improve the accessibility of the web page being analyzed.

Figure 4:
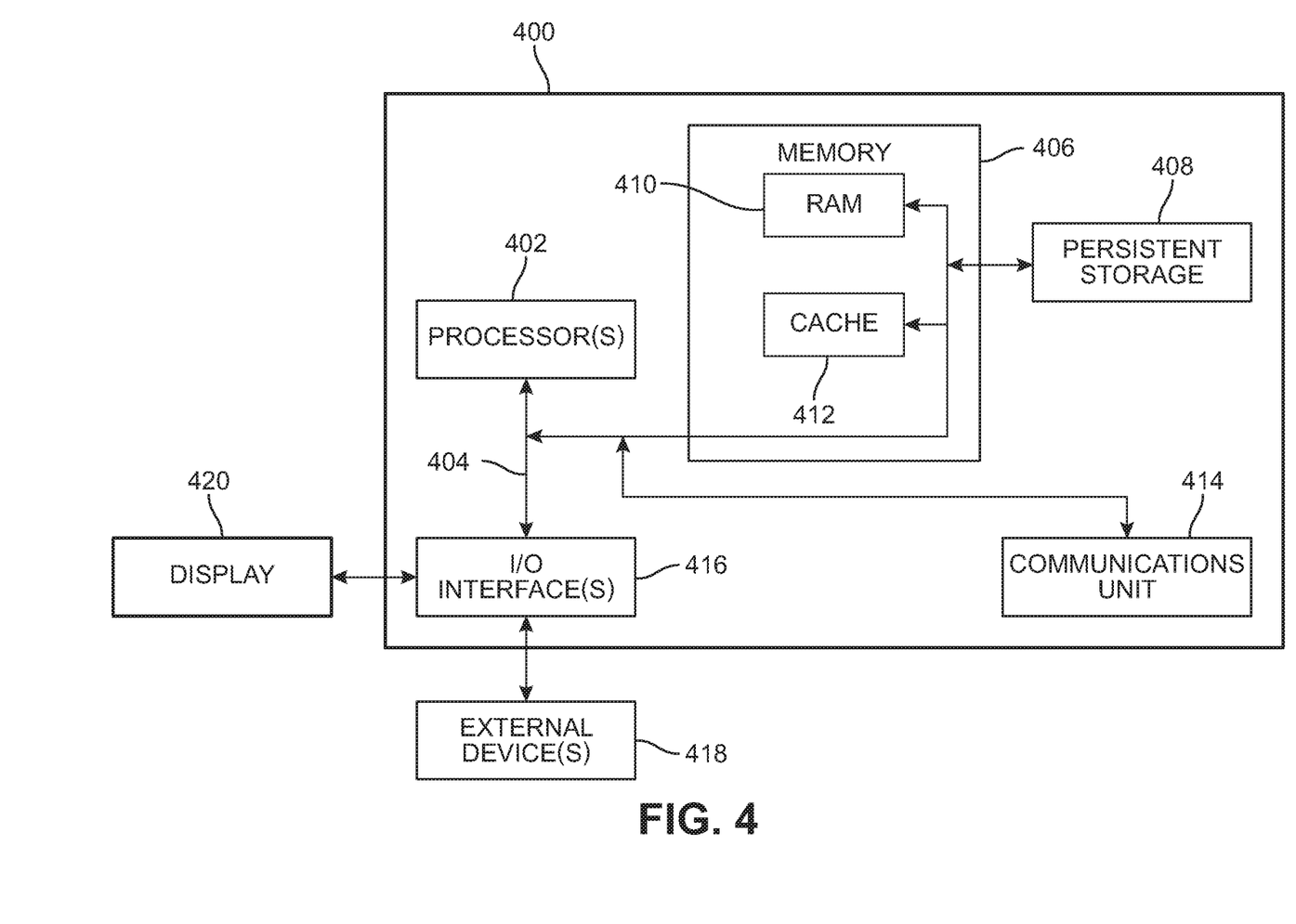
FIG. 4 is a block diagram of an example embodiment of a computing system for implementing techniques for facilitating identification of navigation regions.

FIG. 4 illustrates a block diagram of components of a representative computer 400 including a processor 402 that is configured to implement the techniques for facilitating identification of navigation regions in a web page based on DOM analysis described herein according to an example embodiment. For example, processor 402 of computer 400 may execute a web browser, a browser extension, or application to implement the method of the present embodiments. Processor 402 may be associated with a personal computer and/or a server, as well any type of computing device. It should be appreciated that FIG. 4 provides only an illustration of one implementation and does not imply any limitations with regard to the environments in which different embodiments may be implemented. Many modifications to the depicted environment may be made.

As shown in FIG. 4, computer 400 includes a communications fabric 404, which provides communications between processor(s) 402, memory 406, persistent storage 408, a communications unit 414, and input/output (I/O) interface(s) 416. Communications fabric 404 can be implemented with any architecture designed for passing data and/or control information between processors (such as microprocessors, communications and network processors, etc.), system memory, peripheral devices, and any other hardware components within a system. For example, communications fabric 404 may be implemented with one or more buses.

Memory 406 and persistent storage 408 are computer-readable storage media. In this embodiment, memory 406 includes a random access memory (RAM) 410 and a cache memory 412. In general, memory 406 can include any suitable volatile or non-volatile computer-readable storage media.

One or more programs may be stored in persistent storage 408 for access and/or execution by one or more of the respective processors 402 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 414, in these examples, provides for communications with other processors, data processing systems, or devices. In an example embodiment, communications unit 414 may include one or more network interface cards. Communications unit 414 may provide communications through the use of either or both physical and wireless communications links.

I/O interface(s) 416 allows for input and output of data with other devices that may be connected to computer 400. For example, I/O interface 416 may provide a connection to external devices 418, such as a keyboard, keypad, a touch screen, an assistive or adaptive technology device, and/or some other suitable input device. External devices 418 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 416. I/O interface(s) 416 may also connect to a display 420. Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for facilitating identification of navigation regions in a web page based on document object model (DOM) analysis comprising:
    analyzing the web page for features, wherein the features include selected from the group consisting of: interactive elements, content regions, link region roots, or landmarks;

representing the features in a tree structure;
analyzing the tree structure for link density;
identifying non-main landmarks, a reading order, and main content roots based on combinations of positions and link densities for each of the features in the tree structure; and
enabling a region navigation for the web page based on the identified non-main landmarks, reading order, and main content roots.

2. The method of claim 1, wherein the web page is compliant with an accessible rich internet application (ARIA) specification.

3. The method of claim 2, wherein the main content roots are merged.

4. The method of claim 3, further comprising merging the main content roots by inserting selected from the group consisting of a division (DIV) object or a main element into the DOM.

5. The method of claim 1, wherein the method is implemented by a web browser.

6. The method of claim 1, further comprising automatically performing the method upon loading of the web page.

7. The method of claim 1, further comprising performing the method upon initiation by a user.

8. A computer program product for facilitating identification of navigation regions in a web page based on document object model (DOM) analysis, the computer program product comprising a computer readable storage medium having program instructions embodied therewith, the program instructions executable by a processor to cause the processor to perform a method comprising:
analyzing the web page for features, wherein the features include selected from the group consisting of: interactive elements, content regions, link region roots, or landmarks;
representing the features in a tree structure;
analyzing the tree structure for a link density;
identifying non-main landmarks, a reading order, and main content roots based on combinations of positions and link densities for each of the features in the tree structure; and
enabling a region navigation for the web page based on the identified non-main landmarks, reading order, and main content roots.

9. The computer program product of claim 8, wherein the web page is compliant with an accessible rich internet application (ARIA) specification.

10. The computer program product of claim 9, wherein the main content roots are merged.

11. The computer program product of claim 10, the method further comprising merging the main content roots by inserting selected from the group consisting of: a division (DIV) object or a main element into the DOM.

12. The computer program product of claim 8, wherein the method is performed by a web browser implemented by the processor.

13. The computer program product of claim 8, the method further comprising automatically executing the method upon loading of the web page.

14. The computer program product of claim 8, wherein the instructions are executed upon initiation by a user.

15. A system for facilitating identification of navigation regions in a web page based on document object model (DOM) analysis, the system comprising selected from the group consisting computer including a processor configured to perform a method comprising:
analyzing the web page for features, wherein the features include of: interactive elements, content regions, link region roots, or landmarks;
representing the features in a tree structure;
analyzing the tree structure for a link density;
identifying non-main landmarks, a reading order, and main content roots based on combinations of positions and link densities for each of the features in the tree structure; and
enabling a region navigation for the web page based on the identified non-main landmarks, reading order, and main content roots.

16. The system of claim 15, wherein the web page is compliant with an accessible rich internet application (ARIA) specification.

17. The system of claim 16, wherein the main content roots are merged.

18. The system of claim 15, wherein the computer is selected from the group consisting of a server or a personal computer of a user.

19. The system of claim 15, wherein the processor is configured to automatically perform the method upon loading of the web page.

20. The system of claim 15, wherein the method is performed by the processor upon initiation by a user.

* * * * *